United States Patent
Herrmann et al.

(10) Patent No.: US 8,260,401 B2
(45) Date of Patent: Sep. 4, 2012

(54) NON-INVASIVE IN-VIVO IMAGING OF MECHANORECEPTORS IN SKIN USING CONFOCAL MICROSCOPY

(75) Inventors: David Herrmann, Rochester, NY (US); Christi Alessi Fox, Rochester, NY (US)

(73) Assignees: University of Rochester, Rochester, NY (US); Lucid, Inc., Rochester, NY (US)

( * ) Notice: Subject to any disclaimer, the term of this patent is extended or adjusted under 35 U.S.C. 154(b) by 1440 days.

(21) Appl. No.: 11/878,638

(22) Filed: Jul. 25, 2007

(65) Prior Publication Data
US 2008/0319322 A1    Dec. 25, 2008

Related U.S. Application Data

(60) Provisional application No. 60/833,240, filed on Jul. 26, 2006.

(51) Int. Cl.
*A61B 6/00*    (2006.01)
(52) U.S. Cl. ....... 600/476; 604/20; 436/23.1; 435/320.5
(58) Field of Classification Search .......... 600/407–410, 600/473–480; 604/20; 514/44; 536/23.1; 435/320.1, 325
See application file for complete search history.

(56) References Cited

U.S. PATENT DOCUMENTS

| | | | |
|---|---|---|---|
| 5,632,741 A | 5/1997 | Zavislan et al. |
| 5,653,706 A | 8/1997 | Zavislan et al. |
| 5,788,639 A | 8/1998 | Zavislan et al. |
| 5,836,877 A | 11/1998 | Zavislan |
| 5,860,967 A | 1/1999 | Zavislan et al. |
| 5,978,695 A | 11/1999 | Greenwald et al. |
| 5,995,867 A | 11/1999 | Zavislan et al. |
| 6,134,009 A | 10/2000 | Zavislan |
| 6,134,010 A | 10/2000 | Zavislan |
| 6,263,233 B1 | 7/2001 | Zavislan et al. |
| 6,304,373 B1 | 10/2001 | Zavislan |
| 6,330,106 B1 | 12/2001 | Greenwald et al. |
| 6,360,115 B1 | 3/2002 | Greenwald et al. |
| 6,411,434 B1 | 6/2002 | Eastman et al. |
| 6,413,252 B1 | 7/2002 | Zavislan |
| 6,424,852 B1 | 7/2002 | Zavislan |
| 6,577,394 B1 | 6/2003 | Zavislan |
| 6,668,186 B1 | 12/2003 | Zavislan et al. |
| 6,684,092 B2 | 1/2004 | Zavislan |
| 6,710,875 B1 | 3/2004 | Zavislan |

(Continued)

FOREIGN PATENT DOCUMENTS

AU    0755153    12/2002

(Continued)

OTHER PUBLICATIONS

Herrmann, David, et al., : "Non-invasive in-vivo confocal imaging of Meissner's corpuscles as a novel measure of sensory neuropathy: a feasibiity study", Neurology, Lippincott Williams & Wilkins, Philadelphia, PA (US), vol. 68, No. 12, Suppl. 1, 1 Mar. 2007, pp. A341-A343.

(Continued)

*Primary Examiner* — Sanjay Cattungal
(74) *Attorney, Agent, or Firm* — Blank Rome LLP

(57) ABSTRACT

Meissner's Corpuscles (MCs) are touch-pressure sensation receptors in glabrous skin. They are imaged by reflectance confocal microscopy to provide a non-invasive, in vivo quantification of their density or size to allow screening for, diagnosis or monitoring of sensory neuropathy and other peripheral nervous system disorders related to diabetes, HIV, or other conditions.

21 Claims, 3 Drawing Sheets

U.S. PATENT DOCUMENTS

| | | |
|---|---|---|
| 6,720,547 B1 | 4/2004 | Rajadhyaksha et al. |
| 6,745,067 B1 | 6/2004 | Zavislan et al. |
| D492,997 S | 7/2004 | DiStasio |
| 6,838,444 B1 | 1/2005 | Zoghbi et al. |
| 6,937,886 B2 | 8/2005 | Zavislan |
| 7,003,345 B1 | 2/2006 | Eastman |
| 7,047,064 B1 | 5/2006 | Zavislan et al. |
| D523,883 S | 6/2006 | Distasio et al. |
| 7,110,114 B2 | 9/2006 | Rajadhyaksha et al. |
| 7,139,122 B1 | 11/2006 | Eastman et al. |
| 7,190,990 B2 | 3/2007 | Zavislan et al. |
| 7,194,118 B1 | 3/2007 | Harris et al. |
| 7,225,010 B1 | 5/2007 | Zavislan |
| 7,227,630 B1 | 6/2007 | Zavislan et al. |
| 7,312,394 B1 | 12/2007 | Weeks et al. |
| 7,321,394 B1 | 1/2008 | Grodevant |

FOREIGN PATENT DOCUMENTS

| | | |
|---|---|---|
| EP | 2068888 A2 | 6/2009 |
| WO | 2008014393 A2 | 1/2008 |

OTHER PUBLICATIONS

Nolano, Maria et al.: "Quantification of myelinated endings and mechanoreceptors in human digital skin", Annals of Neurology, vol. 54, May 30, 2003, pp. 197-205.

Alvarez-Roman, R. et al.: "Visualization of skin penetration using confocal laser scanning microscopy", European Journal of Pharmaceutics and Biopharmaceutics, Elesevier Science Publishers B.V., Amsterdam, NL, vol. 58, No. 2, Sep. 1, 2004, pp. 301-316.

Guinard, Didier et al: "PS-100 and NF 70-200 double immunolabeling for human digital skin Meissner corpuscle 3D imaging", Journal of Histochemistry and Cytochemistry, Histochemical Society, New York, NY, US, vol. 48, No. 2, Feb. 1, 2000, pp. 295-302.

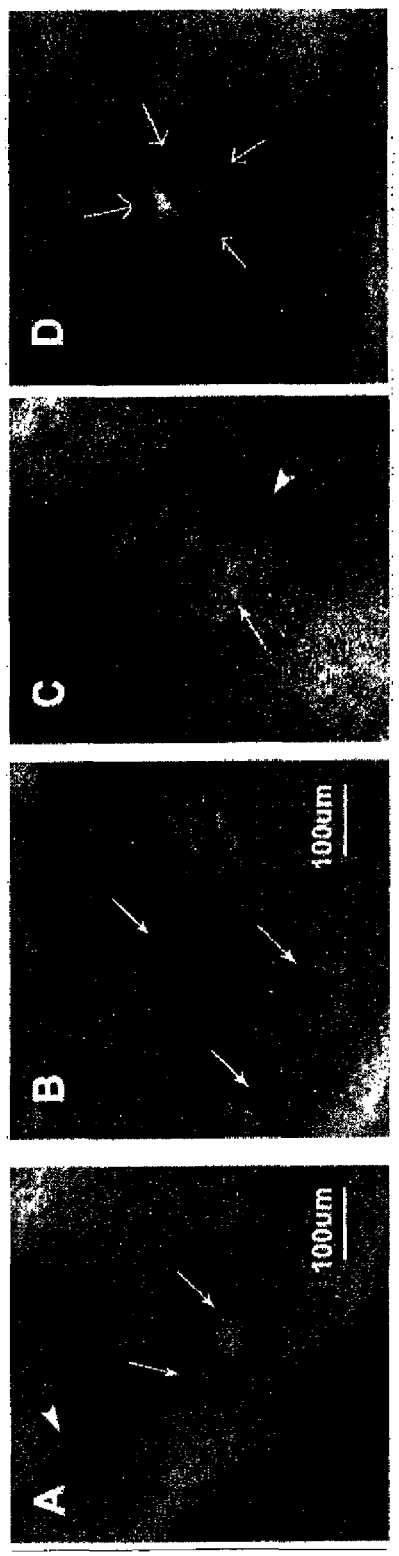
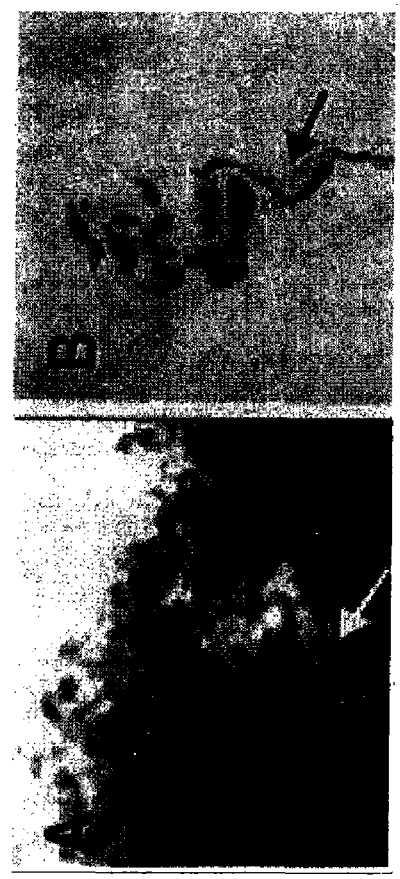

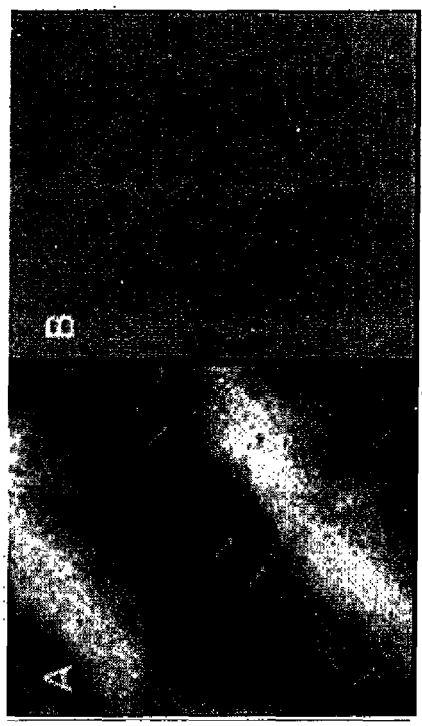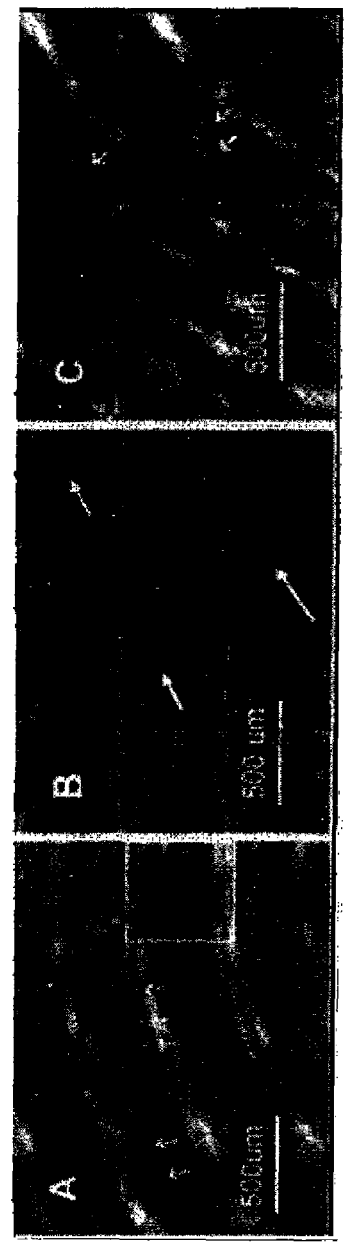

NON-INVASIVE IN-VIVO IMAGING OF MECHANORECEPTORS IN SKIN USING CONFOCAL MICROSCOPY

REFERENCE TO RELATED APPLICATION

The present application claims the benefit of U.S. Provisional Patent Application No. 60/833,240, filed Jul. 26, 2006, whose disclosure is hereby incorporated by reference in its entirety into the present application.

FIELD OF THE INVENTION

The present invention is directed to non-invasive, in vivo imaging of mechanoreceptors in skin using confocal microscopy. It is further directed to such imaging as a diagnostic technique.

DESCRIPTION OF RELATED ART

Meissner's corpuscles (MCs) are the main touch-pressure sensation receptors in non-hairy (glabrous) skin. There has been long-standing interest in assessment of MC density (MC/mm$^2$) as a measure of sensory neuropathies (SN). Recent studies, utilizing glabrous skin biopsies, have suggested that fingertip MC density is a sensitive measure of diabetic and idiopathic distal SN that correlates with epidermal nerve fiber density (ENFD). However, biopsy assessment of MC density has not been widely used, in part as glabrous skin biopsies are more painful and invasive than biopsies of hairy skin used for ENFD counts, require complex processing, and are not suitable for serial monitoring of SN.

Imaging of the human nervous system from the cortex to more recently peripheral nerve trunks has become a critical tool in the clinical and research neurosciences. Non-invasive, human in-vivo imaging approaches, for evaluation of sensory nerve terminals in the skin are not available.

Human in-vivo reflectance confocal microscopy (in-vivo RCM) of skin is an emerging field in Dermatology and Oncology, with applications in the evaluation of skin lesions including cancer. In-vivo RCM provides sub-cellular level image resolution in the epidermis and superficial dermis. In-vivo RCM of skin is painless and non-invasive, and does not require use of contrast agents or fluorophores. However, in-vivo RCM of skin has not yet been applied to measurements of MC density or to diagnostic techniques relating to neurological disorders including SN.

SUMMARY OF THE INVENTION

It is therefore an object of the invention to visualize MCs (and, more generally, mechanoreceptors in human or animal skin).

It is another object of the invention to do so with in-vivo RCM.

It is still another object of the invention to characterize their imaging appearance.

It is yet another object of the invention to assess MC densities for diagnosis of SN.

Too achieve the above and other objects, the invention is directed to in-vivo RCM of MC density. The invention has wide applicability for identification and monitoring of SN during the course of disease and therapy, and as a novel outcome measure for therapeutic trials in peripheral nervous system disorders. It can also be used to screen the status of the sensory peripheral nervous system in patients who are at risk for a condition but who do not yet have it.

MCs are touch-pressure sensation receptors in glabrous skin. Skin biopsy studies suggest fingertip MC density (MCS/mm$^2$) is a sensitive measure of diabetic and idiopathic SN. In-vivo RCM of skin is an emerging field, with applications including evaluation of cancer. It is painless and non-invasive. Feasibility of in-vivo RCM of MCs has not been explored.

Fifteen adults (10 controls, 5 SN) underwent in-vivo RCM at the fingertip (digit 5), and thenar eminence. In-vivo RCM was conducted to determine whether MCs were visible within dermal papillae, and if visible, to characterize their imaging appearance and assess MCs/mm$^2$ at each site.

MCs were identified in dermal papillae at all sites in controls. MCs appeared as heterogeneous bright structures, within dermal papillae which appeared as dark "pits". Mean MC density in controls was 12±5.3/mm$^2$ (digit V) and 5.1±2.2/mm$^2$ at the thenar eminence. MC density in SN was lower than controls at digit V (2.8±5.7/mm$^2$, p=0.01), and the thenar eminence (1.4±1.1/mm$^2$, p=0.004). MCs were absent in a sensory neuronopathy; milder reductions in MC density were seen among diabetic and HIV subjects.

MCs can be visualized and quantitated in controls and SN using in-vivo RCM. In-vivo RCM of MCs has potential for non-invasive detection and monitoring of SN.

The inventors' work has focused on sensory neuropathies (SN), as the imaging evaluates Meissner corpuscles which subserve sensory function (not motor functions). Many peripheral neuropathies are mixed and have sensory and motor components—ie sensorimotor neuropathies. The present invention could have applicability to any form of peripheral nervous system disorder that affects the sensory component. Thus, the present invention can be extended to other peripheral neuropathies or even broader peripheral nervous system disorders which encompasses sensory neuropathies, sensory neuronopathies, sensorimotor neuropathies and small fiber neuropathies.

One use which is covered by the term "monitoring" and by the use of the general word peripheral nervous system disorders, would be to monitor or assess recovery of sensory innervation (nerve supply) to the skin following peripheral nerve surgery or repair. For example if a patient has a nerve traumatized in a limb and a surgeon repaired it, or did a nerve graft, one could monitor recovery by monitoring the improvement in density (or lack thereof) of Meissner's corpuscles in the relevant region of skin on the hand or foot. Another very common instance may be that of carpal tunnel syndrome (compressed median nerve at the wrist). Meissner's corpuscles potentially could be imaged and counted to assess the severity of carpal tunnel syndrome, and also to assess the degree of recovery following carpal tunnel release surgery. Neuropathies such as the median neuropathy at the wrist that produces carpal tunnel syndrome, or other traumatic neuropathies, are focal neuropathies or mononeuropathies, as distinct from the more generalized peripheral neuropathies associated with for example diabetes. These instances and uses (for assessing recovery for example) would be covered by the term monitoring and the broad use of the word peripheral nervous system disorders, that should encompass both generalized peripheral neuropathies and neuropathies affecting a single nerve. Finally, assessment of Meissner's corpuscle density is useful to distinguish between what we term axonal neuropathies or sensory neuronopathies and demyelinating neuropathies. Other diagnostic testing modalities such as nerve conduction studies do this, but there are situations where there is uncertainty, and by assessing whether a Meissner corpuscle density is normal or markedly reduced, could be very helpful to make this differentiation. Again, uses such as this would be covered under the invention.

Moreover, while the experimental data concentrate on the hand, the invention is applicable to other human or animal body parts as well, e.g., feet.

BRIEF DESCRIPTION OF THE DRAWINGS

A preferred embodiment of the present invention will be set forth in detail with reference to the drawings, in which:

FIG. 1A shows glabrous skin from the hand showing a dermal papilla with two Meissner's corpuscles (MCs) (arrows) and an empty papilla (arrow head).

FIG. 1B shows hairy skin of the forearm showing the expected absence of MCs in papillae (arrows).

FIG. 1C shows a higher magnification in vivo RCM image of an MC showing its capsule (arrow head) and internal lobulated structure (arrow).

FIG. 1D shows an MC capsule (arrows) and heterogeneous bright signal on in-vivo RCM of its internal axonal network.

FIG. 2A shows an in-vivo RCM vertical reconstruction of a Meissner corpuscle (MC) from a Z-series of horizontal in-vivo RCM optical sections through the MC. Note that the imaged profile is an MC, by virtue of its structure with a main feeding nerve at its inferior pole (arrow), and a lobulated architecture.

FIG. 2B shows an example of an MC, and its main feeding nerve demonstrated by immunohistochemistry (PGP 9.5) performed on vertical skin biopsy sections. Note that the vertical reconstruction of an MC (from horizontal in-vivo RCM images), has fundamentally similar architecture to the example of an immunolabeled MC.

FIG. 3A shows an approximately 1 mm$^2$ in-vivo RCM imaging area.

FIG. 3B. shows the corresponding histology from the subsequent skin biopsy. The arrows show Meissner's corpuscles (MCs) in FIG. 3A (in-vivo RCM) that correspond to immunostained MCs in the same region.

FIGS. 4A-4C show representative images from 3×3 mm mosaics obtained from the fingertip with in-vivo RCM in a healthy 33 year old woman who was a control subject and a 31 year old woman with a sensory neuronopathy. Mosaics consist of 36 individual adjacent images, each 500×500 μm in size that are in a single horizontal plane and "stitched" together. FIG. 4A shows numerous bright Meissner corpuscle (MC) profiles (arrows) in the control subject. FIG. 4B shows a Z-series stack of 3.1 μm—horizontal section thickness confocal images through a 500 μm×500 μm region of skin containing dermal papillae with MCs (arrows) in the control subject. FIG. 4C shows absence of MCs in the subject with a sensory neuronopathy. Empty dermal papillae appear as dark pits (Panel C, arrows).

DETAILED DESCRIPTION OF THE PREFERRED EMBODIMENT

Figures 5A, 5B:
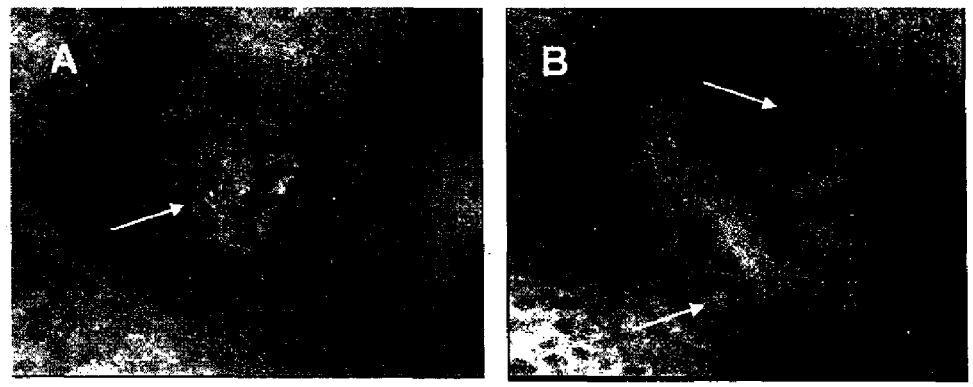
FIGS. 5A-B show in-vivo RCM at the arch of the foot (FIG. 5A) and the dorsum of the great toe (FIG. 5B) in a control subject. The arrows identify examples of Meissner's corpuscles (MCs) at these sites.

A preferred embodiment of the present invention will be set forth in detail with reference to the drawings, in which like reference numerals refer to like elements or steps throughout.

Fifteen adult subjects were recruited to participate in this pilot feasibility study, under a Rochester Subjects Review Board Approved Protocol. Enrolled subjects included 10 healthy adult controls, with no risk factors, symptoms or clinical evidence of a polyneuropathy or mononeuropathy, and 5 subjects with SN (HIV infection 3, Diabetes Mellitus 1, sensory neuronopathy with SLE 1) diagnosed through the neurology clinics at University of Rochester.

In-Vivo Confocal Microscopy Procedure.

A trained technician performed in-vivo RCM within a standardized 3×3 mm skin area over the mid-point of the volar aspect of the distal phalanx of digit V and over the mid point of the thenar eminence of the non-dominant hand in each subject. An in-vivo RCM, (VivaScope 1500, Lucid, Inc, Rochester, N.Y.) was used for all imaging. In order to determine whether MCs could be visualized with in-vivo RCM, the technician performed the imaging through a microscope to skin contact device comprised of a stainless steel tissue ring with a disposable polycarbonate window. A drop of Crodamol STS (Croda, USA), an emollient ester, is placed on the skin, and the tissue ring assembly is placed over the drop of fluid. Using a 30× immersible objective lens and ultrasound gel, a 3×3 mm skin area was imaged at each skin site from the basal layer of the epidermis through the depth of the dermal papillae. This was accomplished by creating 3×3 mm mosaic images at each skin site. These mosaics consist of 36 individual, adjacent 500 μm×500 μm images that are captured in a single horizontal plane and "stitched" together.

Identification of Meissner's Corpuscles (MCs).

Dermal papillae were examined for profiles with morphologic characteristics of MCs, as defined by histological and immunohistochemical studies. Criteria for identifying a profile as an MC on in-vivo RCM included: Location within the tips of dermal papillae of glabrous skin, and absence of similar profiles in hairy skin; Dimensions in the range of those reported for MCs in skin biopsy specimens (mean 80×30 μm); Orientation with the long axis approximately perpendicular to the dermal-epidermal junction; Presence of 0, 1 or occasionally 2 MCs per-dermal papilla; Presence of an encapsulated structure, with an internal lobulated axonal architecture.

Results.

Identification of MCs with In-Vivo RCM.

Ten control subjects were recruited, as indicated in Table I below. Profiles with the signature morphology and distribution of MCs were identified in all control subjects in the dermal papillae at each location (hand digit V, and the thenar eminence). MCs were visualized in cross-section as structures with heterogeneous bright signal characteristics, within dermal papillae which appeared as darks "pits" on in vivo RCM (FIGS. 1A, C, D). Since blood flow is visualized easily within capillary loops with in vivo RCM, they are readily distinguished from MC's.

TABLE I

| Subject | Age Yrs. | Gender M/W | Digit V (hand) MC/mm$^2$ | Thenar eminence MC/mm$^2$ |
|---|---|---|---|---|
| Control | 21 | W | 17 | 6 |
| Control | 29 | M | 6 | 4 |
| Control | 30 | M | 6 | 3 |
| Control | 36 | M | 14 | 4 |
| Control | 40 | W | 16 | 9 |
| Control | 41 | M | 3 | 3 |
| Control | 42 | W | 17 | 7 |
| Control | 47 | M | 10 | 4 |
| Control | 24 | W | 16 | 8 |
| Control | 33 | W | 15 | 3 |
| Sensory neuronopathy | 31 | W | 0 | 0 |
| HIV | 49 | M | 1 | 1 |

TABLE I-continued

| Subject | Age Yrs. | Gender M/W | Digit V (hand) MC/mm² | Thenar eminence MC/mm² |
|---|---|---|---|---|
| HIV | 44 | M | 1 | 1 |
| HIV | 45 | M | 13 | 3 |
| Diabetes | 59 | W | 0 | 2 |

The profiles identified as MCs on in-vivo RCM, had a distribution consistent with that reported on skin biopsy; dermal papillae contained 0, 1 or infrequently 2 MC profiles in glabrous skin (FIG. 1A), while the profiles were not seen in hairy skin (FIG. 1B). The MC capsule and its internal lobulated architecture were visible (FIGS. 1C and 1D). The MC capsule showed low signal intensity on in-vivo RCM, while the internal structure, showed heterogeneous bright signal characteristics (FIGS. 1C and D).

The morphology of the profiles identified as MCs in cross-sectional imaging, was further examined through vertical reconstruction of an identified profile from a Z-series of in-vivo RCM images through the structure (FIG. 2A). The vertical image reconstruction of the profile demonstrated a morphology consistent with an MC, with a main feeding nerve at its inferior pole (white arrow), and a lobulated architecture. The vertical in-vivo image reconstruction of an MC, revealed fundamentally similar architecture to that seen with immunolabeling of MCs in vertical skin biopsy sections (FIG. 2B).

Mapping of MCs on In-Vivo RCM to Corresponding Immunolabeled MCs in a Biopsy from the Site of Imaging.

A correlation of in-vivo RCM and histology was undertaken to further clarify that profiles identified as MCs with in-vivo RCM were MCs. A control subject (M, 40 years) underwent in-vivo RCM of MCs within a 4×4 mm skin area over the hypothenar eminence. Mosaic images were obtained for analysis of MCs. Following imaging, a 3 mm punch biopsy was taken within the imaged area. The biopsy was sectioned at 80 um intervals in a horizontal plane to approximately reproduce the orientation of the skin during in-vivo RCM. The sections were immunostained with polyclonal antibodies to protein gene product (PGP) 9.5, a panaxonal marker, to label MCs. Analysis of skin ridges in the RCM mosaics and biopsy sections allowed identification of a region within the mosaic images that closely corresponded topographically to a region in the biopsy sections (FIGS. 3A-B). MCs identified by in-vivo RCM, mapped to structures that immunolabeled as MCs in the biopsy sections (FIGS. 3A-B). These data further indicated that the structures identified within dermal papillae on in-vivo RCM are MCs.

Feasibility of MC Density Estimates Using In-Vivo RCM.

MCs were counted at each imaging site in 10 control subjects and 5 subjects with peripheral neuropathy, to explore the feasibility of obtaining MC density estimates with in-vivo RCM. For estimation of MC density (MCs/mm²) at each imaging site (digit V, and the thenar eminence), MCs were counted within each (3×3 mm) sampling area. The operating software (VivaScan™) of the Vivascope 1500 allows the user to configure custom image capture profiles and obtain standard data sets. Profiles can be for a horizontal mosaic with specific dimensions, a vertical z-stack of a specific number of images, or a combination of both.

For this study, a 3×3 mm mosaic (FIGS. 4A-C) was acquired through the top of the dermal papillae, so that the most superficial MCs were visible. When the mosaic was complete, the objective lens was moved 30 µm toward the skin, thus changing the depth of the imaging plane by 30 µm. A second 3×3 mm mosaic was captured at this depth, and the objective lens was moved an additional 30 µm. The process was continued until mosaics were captured that covered a depth 150 µm below the basal layer. The imaging process took less than 5 minutes per site. A study of horizontal skin biopsy sections using traditional histology suggested that a single 150 µm thick plane within the skin contains all the MCs in that area of skin. Once the image acquisition was complete, a microscopist visually examined each image in each mosaic and manually counted the number of MCs at each location. Because the microscopist had sequential images of the tissue to a depth of 150 µm below the basal layer, double counting was minimized.

Meissner's corpuscle density estimates (MCs/mm² rounded to the nearest whole) for the control and neuropathy subjects are shown in Table I. Mean MC density in controls was $12\pm5.3/mm^2$ (digit V), and $5.1\pm2.2/mm^2$ at the thenar eminence. MC density in SN was lower than controls at digit V ($2.8\pm5.7/mm^2$, p=0.01 (non parametric Wilcoxon rank sum test)), and the thenar eminence ($1.4\pm1.1/mm^2$, p=0.004) (Table I, FIGS. 4A-C). Among controls, MC density was higher at digit V than at the thenar eminence, and generally higher among men than women. MCs were absent at each imaging site in the subject with a severe sensory neuronopathy. MC densities were lower than the range for control subjects at digit V, in two of the three HIV infected subjects, and absent at this site in the subject with a diabetic neuropathy. The gradient in MC density observed in control subjects between the fingertip and the thenar eminence was lost in 2 out of 3 of the HIV-infected subjects and in the diabetic subject, suggesting length-dependent MC loss.

In order to obtain pilot data on the intrarater reliability of counts of MCs from standardized in-vivo RCM image sets, an experienced in-vivo RCM technician (CAF) counted MCs twice in a masked fashion in a 3×3 mm RCM mosaic from digit V in each of 5 control subjects. The relative intertrial variability (RIV) for each 3×3 mm RCM mosaic was calculated as the difference between count 1 and count 2 divided by the mean of the two counts, multiplied by 100. The mean RIV was $5.1\pm3\%$, and the intraclass correlation coefficient was 0.99. In order to assess interrater reliability an experienced technician (CAF) and a technician (MF) with 5 hours of training in performance of in-vivo RCM, separately counted MCs in a 3×3 mm RCM mosaic from digit V in each of 5 control subjects. The mean RIV was $16\pm9.3\%$ and the intraclass correlation coefficient was 0.91.

Discussion.

There are two main findings.

First, we demonstrate that MCs can be rapidly and painlessly identified with in-vivo RCM. Visualization of MCs with in-vivo RCM is facilitated by their location in dermal papillae; the bright signal characteristics of MCs contrasts with the surrounding low ("dark") signal characteristics of the papillae, and there are no other similar structures within the papillae. The distribution of MCs, as seen with in-vivo RCM mirrors that of the histochemistry literature. MCs are more numerous at the fingertip than the palm, and each dermal papilla has zero, one or occasionally two MCs. In this initial study, we focused on imaging of MCs at the fingertip (a site used in recent skin biopsy studies of MCs in SN) and the hand, however MCs can also be imaged at the foot using in-vivo RCM. FIGS. 5A-B show visualization of MCs at the arch of the foot, and great toe in a control subject.

Second, the pilot data obtained in this study suggests that it is feasible to reliably count MCs from standardized in-vivo RCM image sets, and rapidly estimate MC density (MC/mm²). MC densities have been estimated using different histological techniques. The range of densities we identified in healthy controls at the fingertip is similar to those reported using cholinesterase staining, but lower than that observed in an immunofluorescence study.

We counted MCs at two skin locations in each subject, within a 3×3 mm sampling area. This was accomplished (including the imaging) in approximately 20-30 minutes for each subject. This highlights potential advantages of in-vivo RCM over biopsy for simple counts of MCs. First, a greater skin area can be sampled with imaging. In this study MCs were counted within a 3×3 mm skin area, but a larger skin area could be selected in future studies, or multiple adjacent skin areas could be sampled. Additionally, using specified landmarks an identical skin area can be repeatedly examined with in-vivo RCM to monitor changes in MC density. In contrast, while serial skin biopsies can be taken, the practical frequency with which this can be done is limited, and an identical skin site cannot be re-biopsied for monitoring of MC densities, because of local dermal scar formation with loss of MCs. In-vivo RCM is also painless, non-invasive, and can be rapidly accomplished by a technician with circumscribed training, while processing and analysis of MCs in skin biopsies is tedious and requires specialized histologic techniques, generally limited to major pathology laboratories.

MCs are multi-afferented sensory receptors that comprise nerve terminals of both A-β myelinated somatosensory afferents, and unmyelinated primary afferent axons. MCs primarily mediate touch-pressure sensation, but given unmyelinated primary afferent axon content, they are hypothesized to also transduce mechanical pain sensation. There has been longstanding interest in assessing MCs to detect and quantitate SN. Early skin biopsy studies observed that MC densities were normal in disorders of the central nervous system, but reduced in various peripheral nervous system disorders including Charcot-Marie-Tooth neuropathy, and Friedreich's ataxia, and thus could be considered as a potential marker of peripheral neuropathy. More recently, skin biopsy and in particular quantitation of ENFD, has been developed as a sensitive measure of dying-back SN, where nerve terminals in the skin are affected early, and preferentially. Use of skin biopsy to assess epidermal innervation, is now established as a clinical and research measure of various distal SN (e.g. diabetes, HIV, idiopathic), to which more proximal assessments of nerve trunks such as nerve conduction studies or sural nerve biopsies may be initially insensitive. Since the advent of confocal microscopy and immunofluorescent techniques to label MCs, there has been renewed interest in interrogation of MCs as a measure of distal SN. MC densities have been found to be reduced in skin biopsies of diabetic subjects without clinical or electrophysiological evidence of neuropathy, as compared to controls, a finding that mirrors reductions in ENF density in diabetic subjects without clinical SN. Further, recent data has indicated reductions in fingertip MC density on skin biopsy, that paralleled reductions in ENFD in 25 subjects with painful feet and suspected small fiber neuropathies (SFN). MC densities thus appear to be reduced relatively early in the course of dying-back SN, including those clinically "predominantly small fiber" in type. The preliminary data obtained in this study suggests that in-vivo RCM has potential to non-invasively quantitate reductions in MC density in SN.

Animal and human biopsy studies indicate that MCs have the capacity for reinnervation, following denervation. As in-vivo RCM of MC density can be serially accomplished at standardized locations, it offers the potential to quantify the extent to which myelinated sensory fibers have reinnervated a target region of glabrous skin, and reconstituted MCs necessary for sensation. In-vivo RCM of MC density could therefore also potentially serve as an objective measure of cutaneous denervation and reinnervation in trials of novel therapies, and to follow SN in the clinic, through the course of disease and therapy.

The feasibility of in vivo RCM estimates of mean MC diameter as a measure of MC atrophy will now be discussed. Skin biopsies studies have used simple visual assessments of MC size (normal versus atrophic) as a secondary measure of abnormality (complementary to MC density) of MCs. Data shown in Table II below shows the mean of the maximal diameter of MCs at digit V, as visualized en face in mosaic images from 2 control subjects and from a subject with diabetic neuropathy (whose MC densities are shown above) and a subject with a clinically mild HIV neuropathy, whose MC density at digit V was with in a normal range (13/mm$^2$). Mean MC diameters are lower in the diabetic and HIV neuropathy subjects than in the 2 controls subjects at digit V.

These data provide feasibility that the VivaScope can be used to estimate MC size, and indicate that in-vivo RCM assessment of MC diameter, can demonstrate reductions in MC size (atrophy) in sensory neuropathies as compared with controls. Assessment of MC atrophy on in in-vivo RCM may be used as a measure of abnormality of MCs prior to their loss in peripheral neuropathies.

TABLE II mean MC diameter estimates in controls and neuropathy subjects at digit V

| Subject | Gender | Digit V Mean cross-sectional diameter (μm ± SD) for MCs in sampling area |
|---|---|---|
| Control | F | 58.8 ± 13.1 |
| Control | F | 70.3 ± 5.7 |
| Diabetic neuropathy | F | 33 ± 6 |
| Mild HIV neuropathy | M | 38.4 ± 14.7 |

Figure 6:
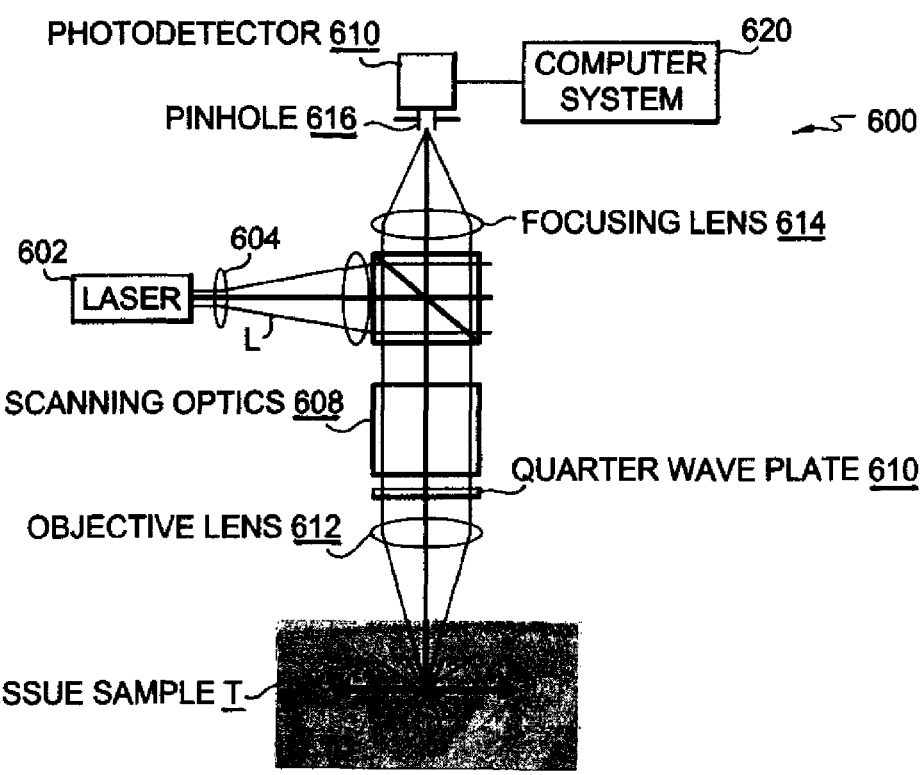
FIG. 6 shows an example of the hardware on which the present invention can be implemented.

FIG. 6 shows a system 600 on which the preferred embodiment can be implemented. Light L from a laser 602 is expanded by a lens 604 and deflected by a beamsplitter 606 through scanning optics 608, a quarter wave (λ/4) plate 610 and an objective lens 612 onto a tissue sample T to be imaged. The light reflected by the tissue sample passes back through the objective lens 612, the λ/4 plate 610 and the scanning optics 608 to the beamsplitter 606, which passes it through a focusing lens 614, a pinhole 616 and a photodetector 618. The photodetector 618 produces image signals, which are received by a computer 620 which produces the images and allows for MC quantification and diagnosis.

The above is a general description of a suitable system. Confocal microscopy of the skin is known in the art, and any suitable system can be used within the context of the present invention. An example is the above-noted VivaScope 1500. Other examples are disclosed in U.S. Pat. No. 7,047,064 to Zavislan et al, "Microscopic imaging apparatus and method," and U.S. Pat. No. 6,937,886 to Zavislan, "System for confocal imaging within dermal tissue." The present invention should not be construed as limited to any particular hardware implementation.

While a preferred embodiment of the present invention has been set forth in detail above, those skilled in the art who have reviewed the present disclosure will readily appreciate that other embodiments can be realized within the scope of the invention. For example, numerical examples are illustrative rather than limiting. Also, the invention has applicability to the diagnosis of conditions other than those specifically disclosed herein. Therefore, the invention should be construed as limited only by the appended claims.

We claim:

1. A method for non-invasive, in vivo quantification of Meissner's Corpuscles in a region of interest on a patient's skin, the method comprising:
   (a) using confocal microscopy to image the region of interest to produce image data;
   (b) analyzing the image data to detect the Meissner's Corpuscles; and
   (c) quantifying the Meissner's Corpuscles in accordance with a result of step (b).

2. The method of claim 1, wherein step (c) comprises quantifying a density of the Meissner's corpuscles.

3. The method of claim 1, wherein step (c) comprises quantifying a size of the Meissner's corpuscles.

4. The method of claim 1, wherein the Meissner's corpuscles are monitored over time.

5. A system for non-invasive, in vivo quantification of Meissner's Corpuscles in a region of interest on a patient's skin, the system comprising:
   a confocal microscope for imaging the region of interest to produce image data; and
   a computer, configured to receive the image data, analyze the image data to detect the Meissner's Corpuscles and quantify the Meissner's Corpuscles.

6. The system of claim 5, wherein the computer quantifies a density of the Meissner's corpuscles.

7. The system of claim 5, wherein the computer quantifies a size of the Meissner's corpuscles.

8. The system of claim 5, wherein the computer monitors the Meissner's corpuscles over time.

9. A method for non-invasive, in vivo quantification of Meissner's Corpuscles in a region of interest on a patient's skin in order to diagnose or monitor a condition in the patient, the method comprising:
   (a) using confocal microscopy to image the region of interest to produce image data;
   (b) analyzing the image data to detect the Meissner's Corpuscles;
   (c) quantifying the Meissner's Corpuscles in accordance with a result of step (b); and
   (d) diagnosing or monitoring the condition in accordance with a result of step (c).

10. The method of claim 9, wherein step (c) comprises quantifying a density of the Meissner's corpuscles.

11. The method of claim 9, wherein step (c) comprises quantifying a size of the Meissner's corpuscles.

12. The method of claim 9, wherein the Meissner's corpuscles are monitored over time.

13. The method of claim 9, wherein step (d) is performed for a case in which the condition is a peripheral nervous system disorder.

14. The method of claim 13, wherein the peripheral nervous system disorder is sensory neuropathy.

15. The method of claim 14, wherein the sensory neuropathy is caused by diabetes.

16. The method of claim 14, wherein the sensory neuropathy is caused by HIV.

17. A system for non-invasive, in vivo quantification of Meissner's Corpuscles in a region of interest on a patient's skin in order to diagnose or monitor a condition in the patient, the system comprising:
   a confocal microscope for imaging the region of interest to produce image data; and
   a computer, configured to receive the image data, analyze the image data to detect the Meissner's Corpuscles, quantify the Meissner's Corpuscles and diagnose or monitor the condition.

18. The system of claim 17, wherein the computer is configured to quantify a density of the Meissner's corpuscles.

19. The system of claim 17, wherein the computer is configured to quantify a size of the Meissner's corpuscles.

20. The system of claim 17, wherein the computer is configured to monitor the Meissner's corpuscles over time.

21. The system of claim 17, wherein the computer is configured for a case in which the condition is a peripheral nervous system disorder.

* * * * *